J. W. AYLSWORTH.
CHLORINATED COMPOUND AND PROCESS OF MAKING SAME.
APPLICATION FILED MAY 9, 1907.
914,223.
Patented Mar. 2, 1909.
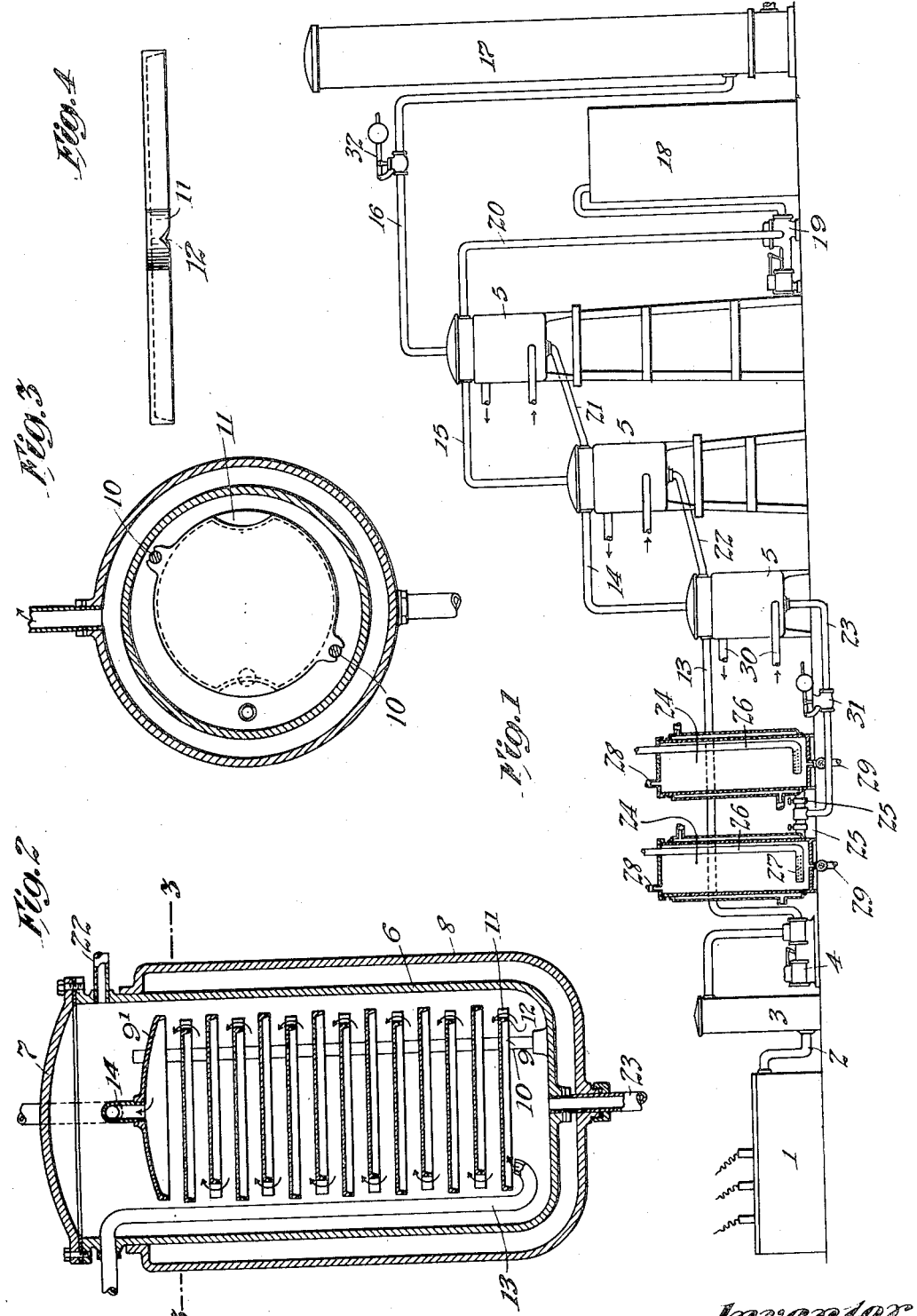

UNITED STATES PATENT OFFICE.

JONAS W. AYLSWORTH, OF EAST ORANGE, NEW JERSEY, ASSIGNOR, BY DIRECT AND MESNE ASSIGNMENTS, TO FIREPROOF PRODUCTS COMPANY, A CORPORATION OF NEW JERSEY.

CHLORINATED COMPOUND AND PROCESS OF MAKING SAME.

No. 914,223.      Specification of Letters Patent.      Patented March 2, 1909.

Application filed May 9, 1907. Serial No. 372,689.

*To all whom it may concern:*

Be it known that I, JONAS W. AYLSWORTH, a citizen of the United States, residing at 223 Midland avenue, East Orange, county of Essex, and State of New Jersey, have invented certain new and useful Processes of Making Chlorin Compounds and Products Thereof, of which the following is a description.

In the manufacture of sodium or potassium, and of soda and potash by the electrolysis of fused chlorids of those metals or solutions of such chlorids, large amounts of chlorin gas are evolved which not only to a very considerable extent have been regarded as waste products, but the effective disposition of such gas has presented a serious problem, owing to its noxious character. It is true that to some extent the chlorin gas has been used in the manufacture of bleaching powder, but the demand for bleaching powder is not large enough to warrant the use of all of the chlorin evolved in the alkali manufacture for that purpose.

The object of my invention is to provide an effective process by means of which chlorin gas obtained in connection with electrolytic alkali manufactured from chlorids or from any other cheap and copious source may be effectively used for the production of hydrochloric acid (for which a very large demand exists) while at the same time I may obtain as a by-product a material that may be put to a number of industrial uses, as I will more fully hereinafter describe.

My invention is based on the fact that when chlorin gas, preferably in the presence of heat and under pressure, is brought in contact with a suitable organic body, either liquid or capable of becoming liquid by heat, such as hydrocarbon oils, naphthalene, paraffin, stearic acid, and similar bodies, the organic material becomes gradually chlorinated, resulting in the formation of chlorin addition and substitution products and of hydrochloric acid gas. With such a reaction, for every atom of chlorin which is substituted for hydrogen in the organic material, one molecule of hydrochloric acid gas is produced. Where it is not important to obtain a chlorinated by-product, and where the manufacture of hydrochloric acid is principally desired, the chlorin gas under heat and pressure, may be brought into contact with an organic material, such as rosin, oleic acid and various gummy bodies, maintained in a liquid state by heat, and the chlorination may be permitted to progress until about one-half of the substitutable hydrogen has been replaced by the chlorin, after which the partially chlorinated product thus obtained is decomposed at a higher temperature, resulting in the production of hydrochloric acid gas and tarry residues as by-products. I prefer, however, the simple chlorinating process, not only because it is capable of being more effectively carried out, but also because chlorinated materials are obtained which can be utilized effectively in the arts. For example, I have discovered that if naphthalene is highly chlorinated it can be converted into a very effective fireproofing material for the treatment of wood and fabric, being in this respect superior to any fireproof material of which I have knowledge. Such chlorinated naphthalene will also be very cheap and can be readily handled for saturating or otherwise treating the material desired. For the proper chlorination of the material, it is necessary that the chlorin gas should be brought in contact with the material in such a way as to present a relatively enormous surface, since the chlorination progresses very slowly toward the end of the operation. It is also important that as the chlorinating effect of the chlorin gas is gradually reduced by admixture therewith of gradually increasing amounts of hydrochloric acid gas, it should encounter the material carrying the maximum value of the substitutable hydrogen; or in other words, the chlorin gas and the material should be slowly progressed in opposite directions and in contact with one another.

In carrying the invention into effect, I prefer to make use of a series of chlorinating vessels of such a character that a very large surface of the hydrocarbon material in each will be exposed to the chlorin gas, and I slowly progress the chlorin under pressure successively through the said chlorinating vessels, while at the same time the liquid material is slowly progressed in the opposite direction through the chlorinating vessels, suitable means being provided for maintaining the desired temperature within the chlorinating vessels, and a suitable pressure being maintained therein to effect the chlorination of the material, the degree of such temperature and the extent of such pressure depending somewhat upon the particular material under treatment. Provision is made for drying the chlorin gas before entering the apparatus, in order that it may be safely compressed in a suitable pump or compressor, although this will not be necessary if sufficient pressure can be developed within the electrolytic apparatus in which the primary reactions take place. Provision is also made for properly collecting the evolved hydrochloric acid gas, preferably by absorbing the same in water in an ordinary acid condensing tower. Finally, provision is made for collecting the chlorinated material (assuming that the chlorinated material is desired as a product of the process) and freeing the material from dissolved chlorin by blowing air therein, or by suitable washing operations or in any other suitable way. The passage of the liquid material through the apparatus in the carrying out of the process may be effected either intermittently or continuously, and the same is true as to the forcing of the chlorin gas through the apparatus in contact with the material.

In order that the invention may be better understood attention is directed to the accompanying drawings, forming part of this specification, and in which—

Figure 1, is a diagrammatic view, illustrating a suitable apparatus for carrying the process into effect, Fig. 2, an enlarged sectional view of one of the chlorinating vessels which I prefer to use, Fig. 3, a sectional view on the line 3—3 of Fig. 2, and Fig. 4, a front view of one of the pan-like partitions employed in the chlorinating vessels.

In all of the above views, corresponding parts are represented by the same numerals of reference.

1 represents diagrammatically any suitable electrolytic apparatus for use in alkali manufacture from chlorids thereof; for instance the apparatus used with the so-called Acker process, and wherein the effect of electrolysis is to generate chlorin gas as a by-product. It will be understood of course that the chlorin gas may be obtained from any other cheap and copious source but the electrolytically generated chlorin is preferred as being more active in its reaction upon organic matters. The chlorin is led through pipe 2, into a suitable drying apparatus 3 of any desired type, whereby the gas may be made perfectly dry, so as to permit of its being effectively compressed. It will be understood that when the chlorin gas can be generated under sufficient pressure so as to not require the use of pumping apparatus, the drying device 3 and pump 4 may be omitted. From the drier 3 the gas is led to the compressor 4, by which it is forced under the desired pressure through one or more chlorinating chambers 5, three being shown. I prefer to make use of a series of chlorinating chambers, in order that a higher temperature may be maintained in the chamber nearer the compressor 4, and successively lower temperatures in the others, so that the material as it becomes gradually more and more chlorinated will be subjected to successively higher temperatures. In this way I obtain the best results because as the hydrocarbon material becomes gradually chlorinated, the rate at which the chlorination is effected is reduced, but by employing successively higher temperatures in the succeeding chlorinating vessels, the rate of chlorination will be more nearly uniform.

Each chlorinating chamber is formed of a vessel 6, having a removable top 7, and each being heated independently in any suitable way, as for example, by a steam jacket 8. Each of the chambers 6 is made of lead or earthen ware, or other suitable material not affected by the chlorin and capable of withstanding the pressures used. The chlorinating chambers are of such a character that the liquid hydrocarbon material flowing through the same will be subjected to relatively large areas of surface contact with the chlorin gas, and for this purpose I prefer to arrange within each chlorinating chamber a series of pan-like partitions 9 having the general form of an inverted pan, mounted one above the other and supported in any suitable way, as for example, by the rods 10, 10. Each of the partitions or inverted pans is formed with a recess 11 in its rim, having a notch 12 therein, and these recessed portions are staggered as shown, whereby the gas entrapped beneath the bottom partition will be permitted to escape slowly through the notch 12 thereof, into the partition immediately above the same, and in turn escape through the opposite edge of the second partition to the third partition, and so on, throughout the series. In this way, I not only maintain large bodies of chlorin gas submerged below the level of the liquid material, so as to present extended areas of surface contact of the gas therewith, but I cause the gas to travel a relatively great distance in passing through each chlorinating apparatus so as to act on the liquid material in the most effective manner. The pipe 13 from the pump 4 leads into the first chlorinating chamber and delivers the gas under the lowermost partition 9 thereof, while the gas escapes through the pipe 14 which leads from the hood 9' located above the top partition 9 and extends in a similar manner below the lowermost partition of the second chlorinating chamber from the corresponding hood from which the gas escapes by a pipe 15, which is led below the lowermost partition of the third chlorinating chamber and from the corresponding hood of which the pipe 16 leads to an ordinary condensing tower 17, by which the hydrochloric acid is absorbed in water in the usual way, while any waste gases escape at the top, as in the usual manufacture of hydrochloric acid. The organic material (either normally liquid or maintained in a liquid state by heat) is contained in a tank 18, from which it is forced by a pump 19, and pipe 20 into the upper end of the third chlorinating chamber so as to submerge the pan-like partitions thereof. From the third chlorinating chamber the liquid passes by a pipe 21 into the upper end of the second chlorinating chamber and from the latter it passes by a pipe 22 into the upper end of the first chlorinating chamber. From the lower end of the first chlorinating chamber, the chlorinated liquid passes by a pipe 23 into either of the pair of receiving tanks 24, valves 25 permitting the liquid to be directed into either of said tanks. In order to free the chlorinated liquid of any dissolved chlorin, I provide pipes 26, having perforated lower ends 27, and by means of which air may be injected into the liquid escaping through a vent 28. During this treatment, the chlorinated material in either of said tanks 24 is heated somewhat higher than its temperature during the chlorination, (for instance, by steam jackets as shown surrounding said tanks) and also, the chlorinated material, by the same means, is maintained in a heated condition at all times in said tanks, so as to be kept fluid and permit of ready handling. From either of the tanks the liquid may be drawn off through valved pipes 29. Steam for heating the steam jackets of the several chlorinating chambers may be admitted by pipes 30, although as stated, the chambers may be heated in other ways.

In order to maintain the desired pressure within the apparatus, I prefer to employ an ordinary relief valve 31 mounted in the pipe 23 which does not open until a predetermined pressure is reached, and I place a similar relief valve 32 in the pipe 16, which opens only when a predetermined pressure is reached. These relief valves are so adjusted that when the desired pressure exists within the apparatus the level of the liquid in the third and uppermost chlorinating chamber will be maintained, somewhat above the uppermost partition therein, so as to remove the possibility of the liquid being forced through the pipe 16 by the gas pressure.

In operation, a suitable organic material either normally liquid or rendered so by heat, of which an excellent example is naphthalene is forced by the pump 19 against the pressure within the apparatus so as to fill the chlorinating chambers and slowly pass the relief valve 31, into one or the other of the receiving tanks 24. Until the gas enters the apparatus the liquid will, therefore, fill the pipes 14 and 15, and so much of the pipe 13 as the compression of air therein will permit. The chlorin gas is now forced in the apparatus by the pump 4 from the tower 3, and enters the pipe 13, displacing the air and liquid therein, said gas escaping into the space beneath the lowermost partition of the first chamber and driving out the air before it, gradually rising into the successive partitions, and escaping through the pipe 14 into the second chlorinating chamber, where the same action takes place. In thus passing slowly into contact with the liquid material under the effect of the temperature and pressure within the apparatus, the material gradually becomes chlorinated and reactions take place between the chlorin and the substitutable hydrogen of the hydrocarbon to form hydrochloric acid, so that by the time the gas leaves the apparatus through the pipe 16, it will be substantially pure hydrochloric acid gas, the heat and pressure employed accelerating the reaction and causing it to be complete with total absorption of chlorin. This gas enters the condensing tower 17, where it is absorbed in water in the usual way. The chlorinated material entering one of the receiving tanks 24 will gradually fill the same, and when this tank is filled it is directed into the other tank. While the second tank is being filled with the chlorinated material, air is blown into the chlorinated material already received in the first tank, so as to remove any dissolved chlorin and the material thus treated is drawn out by the pipe 29, and the tank again made ready for receiving the chlorinated material from the first of the chlorinating chambers. Instead of treating the chlorinated material with air, as explained, it may be washed or subjected to other known operations. For the effective chlorination of naphthalene, as explained, a pressure of from ten to fifty pounds or more per square inch may be maintained within the apparatus. I find, in fact, that naphthalene even under atmospheric pressure, and when subjected to a temperature of only 212° F. absorbs chlorin quite rapidly (the rate, according to my determinations, being about one gram per square inch per hour) but under the same conditions the rate of absorption of chlorin near the completion of the operation is much slower, being in fact, only about .15 gram per square inch per hour. If, however, the temperature and pressure are raised within safe limits,—having in mind the prevention of decomposition of the naphthalene, or other hydrocarbon, as well as the safety of the apparatus—the rapidity of absorption will be increased. For commercial operation, I would not advise a temperature in excess of 300° F. or a pressure exceeding fifty pounds per square inch. As previously stated, the maximum temperature preferably exists in the chlorinating chamber nearest the compressor 4, the temperatures in the preceding chamber being successively reduced, and the pressure of course being the same, or substantially so, in all. Since the chlorin is forced into the chlorinating vessels at one end of the series under pressure and melted naphthalene is forced in under pressure at the other end of the series, the relief valves 31 and 32 will provide for the maintenance of a substantial uniformity of pressure throughout.

I find in the chlorination of naphthalene, that the addition of a small percentage of chlorid of antimony to the material in course of treatment greatly facilitates the chlorinating operation, owing to its catalytic effect as a chlorin carrier. Naphthalene that has been completely chlorinated by the operations above described, yields a solid wax-like material, capable of being sublimed without decomposition at a temperature of about 600° F., having a melting point of 262° F., and a specific gravity of about 1.850. It is soluble in chloroform, carbontetrachlorid and naphtha. The completely chlorinated product contains about 68% of chlorin. With other organic materials, the pressures and temperatures may be somewhat varied, depending upon the character of the material treated. When it is not important that chlorinated final product should be obtained and where a larger yield of hydrochloric acid is desired, a less resistant organic material such as oleic acid may be passed through the apparatus and the chlorination be permitted to progress until about one-half of the substitutable hydrogen has been replaced by chlorin. The hydrochloric acid evolved from such a material will be directed to the condensing tower 17, as already described, but instead of preserving the chlorinated or partially chlorinated material as a finished product, it may be decomposed by the application of a higher temperature, so as to result in a further production of hydrochloric acid with a tarry residue. I prefer, however, to treat a hydrocarbon material which will result in a substantially non-decomposable chlorinated hydrocarbon, such as naphthalene, because such a chlorinated material may be used commercially in the arts. For instance, I have discovered that chlorinated naphthalene is a very valuable fireproofing material, and I have claimed such use of the same in an application Serial No. 372,688 filed on even date herewith. I do not claim herein the specific process described, of partially chlorinating the hydrocarbon material and then decomposing the same, as I intend to make that specific process the subject of a separate application for Letters Patent.

Having now described my invention, what I claim as new and desire to secure by Letters Patent is as follows:—

1. The process of manufacturing hydrochloric acid, which consists in effecting a reaction under heat and pressure between chlorin gas and naphthalene, substantially as and for the purposes set forth.

2. The process of manufacturing hydrochloric acid, which consists in maintaining a suitable liquid organic material under pressure in a heated condition and in forcing chlorin gas through the liquid material, substantially as set forth.

3. The process of manufacturing hydrochloric acid, which consists in maintaining a suitable liquid organic material under pressure in a heated condition, and in submerging within the same a body of chlorin gas having a relatively large surface area as compared to its volume and presenting an extended area to the action of the liquid material, substantially as set forth.

4. The process of manufacturing hydrochloric acid, which consists in maintaining a liquid organic material in a heated condition under pressure and in submerging beneath the same a series of bodies of chlorin gas, each of extended area as compared to its volume, substantially as set forth.

5. The process of manufacturing hydrochloric acid, which consists in maintaining a liquid organic material under heat and pressure, in submerging beneath the same a series of bodies of chlorin gas, each of extended area as compared to its volume, and in causing the chlorin to progress successively throughout the series, substantially as set forth.

6. The process of manufacturing hydrochloric acid, which consists in slowly progressing a body of liquid organic material under pressure in one direction, and in slowly progressing chlorin gas through the liquid material in the other direction, substantially as set forth.

7. The process of manufacturing hydrochloric acid, which consists in slowly moving in one direction a confined body of a liquid organic material maintained in a heated condition, in slowly moving in the opposite direction through the liquid a stream of chlorin gas, and in causing the chlorin to form shallow flattened layers within the liquid so as to present to the latter an extended area as compared to its volume, substantially as set forth.

8. The process of manufacturing hydrochloric acid, which consists in slowly moving in one direction a confined body of a liquid organic material maintained in a heated condition under pressure, in slowly moving in the opposite direction through the liquid a stream of chlorin gas, and in absorbing in water the hydrochloric acid thereby produced, substantially as set forth.

9. The process of manufacturing hydrochloric acid, which consists in slowly moving in one direction a confined body of a suitable organic material maintained under heat and pressure, in forcing a stream of chlorin gas through the liquid in the opposite direction thereby effecting a chlorination of the liquid, and in finally freeing the chlorinated liquid of dissolved chlorin, substantially as set forth.

10. The process of manufacturing hydrochloric acid, which consists in slowly moving in one direction a confined body of a suitable organic material maintained under heat and pressure, in forcing a stream of chlorin gas through the material in the opposite direction, thereby effecting a chlorination of the material, and in finally blowing air through the chlorinated material, so as to free the same of dissolved chlorin, substantially as set forth.

11. The process of utilizing the chlorin gas evolved in electrolytic alkali manufacture, which consists in drying electrolytic chlorin and in maintaining the same under pressure within a body of liquid organic material to thereby form hydrochloric acid, substantially as set forth.

12. The process of utilizing the chlorin gas evolved in electrolytic alkali manufacture, which consists in drying electrolytic chlorin and in maintaining the same under pressure within a body of liquid organic material maintained in a heated condition, to thereby form hydrochloric acid, as and for the purposes set forth.

13. The process of utilizing the chlorin gas evolved in electrolytic alkali manufacture, which consists in drying electrolytic chlorin and in maintaining the same under pressure within a body of liquid organic material maintained under heat and pressure, to thereby form hydrochloric acid, as and for the purpose set forth.

14. The process of utilizing the chlorin gas, evolved in electrolytic alkali manufacture, which consists in drying the gas and in maintaining the same under pressure within a body of heated naphthalene to thereby form hydrochloric acid and chlorinated naphthalene, as and for the purpose set forth.

15. The process of utilizing the chlorin gas evolved in electrolytic alkali manufacture, which consists in drying the gas and in maintaining the same under pressure within a body of heated naphthalene, maintained under pressure to thereby form hydrochloric acid and chlorinated naphthalene, as and for the purposes set forth.

16. The process of utilizing the chlorin gas, evolved in electrolytic alkali manufacture, which consists in drying the gas, in forcing the same under pressure into a body of liquid organic material maintained under heat and pressure, to thereby form hydrochloric acid, and in finally absorbing the hydrochloric acid in water, substantially as set forth.

17. The process of manufacturing hydrochloric acid, which consists in slowly progressing a body of liquid organic material under pressure in one direction, in subjecting the liquid to successively increasing temperatures as it progresses, and in slowly progressing chlorin gas through the liquid in the other direction, substantially as set forth.

18. As a new product, a chlorinated derivative of naphthalene, said derivative being a waxlike body, containing about 68 percent. of chlorin, subliming without decomposition at a temperature of about 600° F., melting at about 262° F., having a specific gravity of about 1.850 and being soluble in chloroform, carbon tetrachlorid and naphtha.

This specification signed and witnessed this 7th day of May, 1907.

JONAS W. AYLSWORTH.

Witnesses:
FRANK L. DYER,
FRANK D. LEWIS.